United States Patent [19]

Pennell et al.

[11] Patent Number: 4,587,990
[45] Date of Patent: May 13, 1986

[54] MODULAR BALL VALVE

[75] Inventors: Raymond Pennell, Tomball; Bobby J, Reneau, Houston, both of Tex.

[73] Assignee: Gripper, Inc., Houston, Tex.

[21] Appl. No.: 664,068

[22] Filed: Oct. 23, 1984

[51] Int. Cl.⁴ ............................................. F16K 25/00
[52] U.S. Cl. ................................. 137/454.2; 251/309; 251/315
[58] Field of Search .......................... 137/454.2, 454.6; 251/309, 312, 315, 152, 148

[56] References Cited

U.S. PATENT DOCUMENTS 2,997,057  8/1961  Toth .................................. 137/454.2
3,179,121  4/1965  Bredtschneider et al. ...... 137/454.6
3,934,606  1/1976  Mattews ........................... 137/454.6

Primary Examiner—James C. Yeung
Attorney, Agent, or Firm—Pravel, Gambrell, Hewitt & Kimball

[57] ABSTRACT

A modular valve including an outer housing having a longitudinal bore adapted to be aligned with the pipeline bore of a pipeline and a transverse bore which receives a modular housing assembly which includes a rotatable valve element for controlling flow through the outer housing longitudinal bore and thus through the pipeline in which the valve is mounted. The internal housing assembly is modular and can be removed and replaced should the valve need repair without the necessity of having to remove the entire housing from the pipeline in which it is installed.

5 Claims, 3 Drawing Figures 4,587,990

MODULAR BALL VALVE

FIELD OF THE INVENTION

This invention relates to valves which may be repaired without removal of the entire valve from a pipeline or flow line in which the valve is installed.

BACKGROUND OF THE INVENTION

Over the last several decades, burgeoning offshore oil and gas well drilling and production industry have spawned the laying of subsea pipelines across the ocean floor. Typically, it is necessary for these subsea pipelines to be laid and serviced by divers. It is of course, as in all types of flow lines, necessary to install valves in the subsea pipelines in order to control flow for making repairs or for other purposes. Many of these subsea pipelines are fairly large in diameter and thus the valves are also extremely heavy and large in size and thus difficult to install. Like all valves, subsea valves occasionally malfunction and need repair. In known subsea valves, it is necessary for divers to remove the entire valve including the housing from the flow line in order to repair the valve. After removal, the valve can be raised to a ship deck and repaired and then replaced in the pipeline or a new valve can be put into the pipeline. In either event, it is necessary for the divers to remove the entire valve from the pipeline in order to make many types of repairs. Such removal is time consuming, difficult and expensive.

SUMMARY OF THE INVENTION

It is an object of this invention to provide an new and improved modular valve which can be used in many valve applications where it is necessary or desirable to repair the valve without having to remove the entire valve from the flowline or pipeline. The modular valve of the preferred embodiment of this invention includes an outer housing generally cylindrical in configuration and having a flowline bore extending therethrough along a longitudinal axis. The outer housing includes a mount means for mounting the outer housing in a pipeline or flowline having a pipeline or flowline bore which aligns with the longitudinal bore of the outer housing. The outer housing also has a transverse valve bore extending into the outer housing. The transverse bore extends across the flowline bore and a modular valve means is mounted within the transverse bore. The modular valve means includes sealing means mounting said modular valve means in a sealed relationship with the transverse bore of the outer housing and a valve assembly and mount means mounting the valve assembly for movement within the modular valve means between open and closed positions in order to control flow through the flowline bore of the outer housing. A modular mount means interconnects the sealing means, valve assembly and mount means into a module for removal as a unit from the outer housing. Utilizing the structure of this invention, it is possible to mount the modular valve into a flowline such as a subsea flowline and, rather than having to remove the entire valve when repairs are necessary, the modular valve means can be removed leaving the outer housing in place and repairs can be made on the modular valve means or a new modular valve means can be installed in the outer housing thereby enhancing repairs of the valve.

This summary of the invention does not describe all the patentable features of this invention. The specification which follows describes the preferred embodiment of the invention and the claims set forth the features of this invention in detail.

BRIEF DESCRIPTION OF THE DRAWINGS

FIG. 3 is a top view of a section of the internal housing of the modular valve means.

DESCRIPTION OF THE PREFERRED EMBODIMENT

Figure 1:
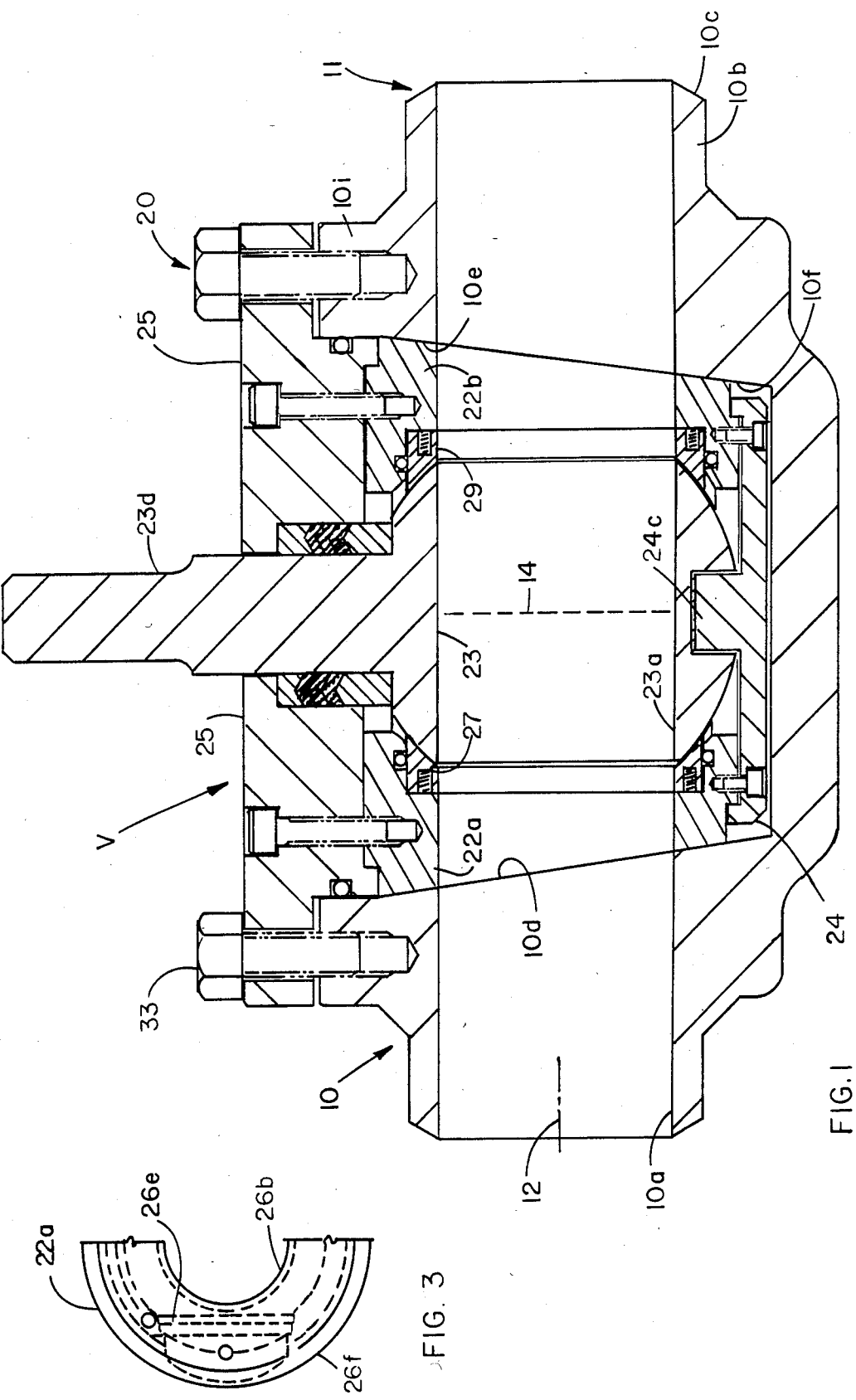
FIG. 1 is a sectional view of the modular valve of the preferred embodiment of this invention.

Referring to the drawings, the letter V generally designates the modular valve of the preferred embodiment of this invention. The modular valve includes an outer housing generally designated as 10. The outer housing is generally cylindrical in configuration and includes an outer housing mount means 11 for mounting the outer housing into a flowline or pipeline. The outer housing 10 includes a first, longitudinal flowline bore 10a which extends through the outer housing 10 and has as its center the longitudinal axis 12 of the outer housing. Each end such as 10b of the outer housing terminates in an annular beveled edge 10c which may be aligned with a corresponding beveled edge on a pipeline (not shown) so that a welder can weld the outer housing into a pipeline or flowline. Alternately, the end 10b can be welded onto a flange in a known manner so that the flange can then be mated with a corresponding flange on a flowline or pipeline thus mounting the outer housing 10 of the modular valve V in a flowline or pipeline. Once mounted in the pipeline, the longitudinal bore 10a of the modular valve V is aligned with the bore in the flowline or pipeline in a known manner.

The outer housing 10 includes a second, transverse bore 10d which extends transversely to the longitudinal bore 10a. The transverse bore 10d is generally frusto-conical in configuration and has a central axis 14 which is transverse to the longitudinal axis 12 of the outer housing 10. The transverse bore 14 is frusto-conical and thus tapered as viewed in FIGS. 1 and 2. The transverse bore 10d is formed by an upper annular mounting rim or frusto-conical surface 10e and a lower or bottom annular mounting rim or frusto-conical surface 10f. The lower annular frusto-conical surface 10f terminates in a circular, flat bottom portion 10g which is the bottom of the transverse bore 10d. The annular mounting surfaces 10e and 10f are lapped and ground so that metal to metal seals may be formed therewith. The upper annular mounting rim 10e joins an upper cylindrical internal rim surface 10h having an annular surface which is parallel to the transverse bore center line 14. The diameter of the upper annular mounting rim 10e is greater at all points than the diameter of the lower annular mounting rim 10f of the transverse bore thus providing the frusto-conical transverse bore configuration and taper.

The outer housing 10 includes a top annular mounting ledge 10e having a plurality of bolt holes 10j machined therein in a circumferential pattern. The bolt holes are on a circle line that is positioned concentrically outwardly from the internal cylindrical mounting surface 10h of the transverse bore 10d.

Figure 2:
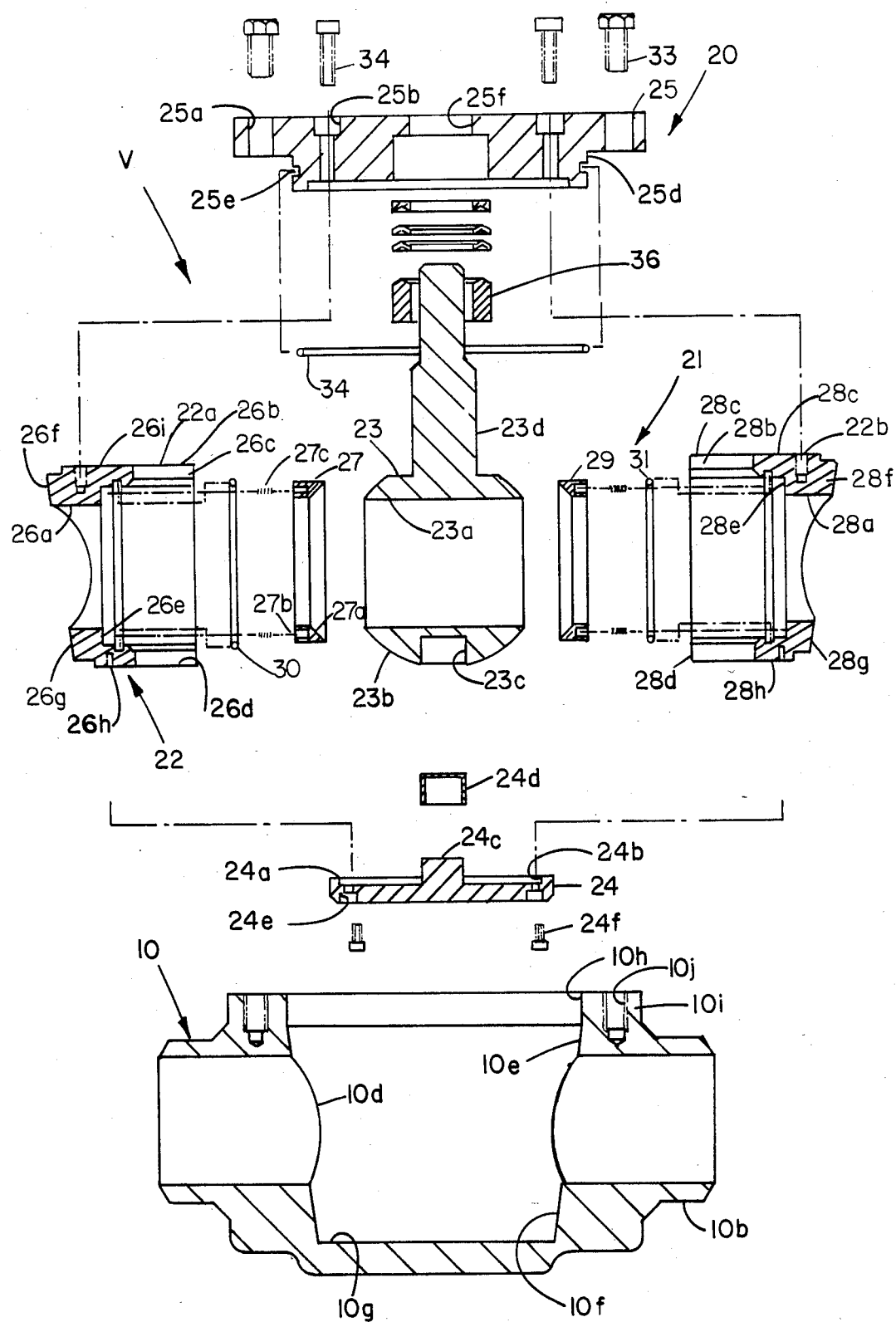
FIG. 2 is an exploded, assembly view of the modular valve illustrating the inner relationship of the various components.

A modular or replaceable valve assembly generally designated by the number 20 and illustrated in an exploded view in FIG. 2 is mounted within the transverse bore 10b of the outer housing 10. The modular valve assembly or means generally designated as 20 is mounted within the transverse bore 10d and provides a valve assembly generally designated as 21 for controlling flow through the longitudinal bore 10a of the outer valve housing 10. The replaceable valve assemby 20 includes a generally cylindrical internal housing 22 having mounted therein a spherical valve element 23 for rotation between a closed position closing off flow through the longitudinal bore 10a of the outer housing 10 and an open position allowing such flow, such open position being illustrated in FIGS. 1 and 2. The cylindrical internal housing 22 is formed of sections 22a and 22b which are connected together by a bottom plate 24 and a top plate 25. The bottom plate 24 is a circular plate having a diameter slightly less than the least diameter of the lower transverse rim portion 10f such that the bottom plate 24 can be mounted within the annular rim portion 10f. The bottom plate 24 includes an outer mounting ridge 24a formed by inwardly facing shoulder 24b (FIG. 2). A central trunion member 24c is machined into the center of the bottom plate 24 and extends upwardly to receive a trunion bearing 24d. A plurality of openings 24e are circumferentially spaced about the bottom plate 24 to receive a plurality of set screws 24f.

The internal housing section 22a is generally cylindrical in configuration as viewed along the housing bore axis 12 and includes a cylindrical bore 26a having a center line which will align with the center line 12 of the outer housing bore 10a after the internal housing section 22a is installed in the manner to be described herein. Referring in particular to FIGS. 2 and 3, the internal housing section 22a includes a transverse internal semi-cylindrical bore 26b formed by upper internal semi-cylindrical machined surface 26c and lower internal semi-cylindrical machined surface 26d. An L-shaped ledge 26e is machined internally of the bore 26a to receive valve seat 27. The internal housing section 22a is generally one-half frusto-conical in configuration formed by an upper frusto-conical semi-annular mounting rim 26f and a lower semi-annular frusto-conical mounting rim 26g. The semi-annular frusto-conical mounting rims 26f and 26g are lapped and ground in order to form metal to metal seals against the internal annular mounting surfaces 10e and 10f, respectively, of the transverse bore 10d of the outer housing 10. The bottom semi-annular face 26h of the internal cylindrical housing section 22 includes a plurality of circumferentially spaced set screw bores. The semi-annular upper face 26i of the section 22a includes a plurality of circumferentially spaced bolt holes. The inside surfaces of the internal housing section 22a terminate in a plane extending through outer housing transverse bore centerline 14.

The second generally cylindrical internal housing section 22b is identical to the internal housing section 22a except that it is the mirror image thereof and is adapted to mate against the section 22a and cooperate with section 22a to mount the valve element 23 for rotational movement therein. The second internal housing section 22b thus includes the longitudinal bore portion 28a which aligns with the longitudinal bore portion 26a. A transverse semi-cylindrical bore 28b is formed by upper internal semi-cylindrical rim face or surface 28c and lower semi-cylindrical internal rim surface 28d. An L-shaped internal circular ledge 28e is machined in bore 28a to receive valve seat 29. The configuration of the internal housing section 22b is one-half of a frusto-conical configuration which is provided by an upper semi-annular frusto-conical surface 28f and a lower semi-annular frusto-conical surface 28g. The internal housing section 22b includes a lower semi-annular face 28h having a plurality of circumferentially spaced set screw holes therein. The section 22b further includes an upper semi-annular face 28i having a plurality of circumferentially spaced bolt holes therein. The internal housing section 22a and 22b are adapted to mate against each other along a plane through central axis 14 and mount within the transverse bore 10d of the outer valve housing 10 with the valve element 23 mounted therein. With the internal cylindrical housing sections 22a and 22b joined together by the bottom plate 24 with set screws 24f in place, the internal housing sections 22a and 22b form an internal housing 22. The internal housing 22 is generally cylindrical in configuration along the longitudinal axis 12 of the outer housing member 10. The internal housing 22 is further frusto-conical in configuration along the longitudinal axis 14. Such frusto-conical configuration is provided by the upper semi-annular frusto-conical surfaces 26f and 28f and the lower frusto-conical semi-annular surfaces 26g and 28g. Further, when joined together, the internal housing sections inside surfaces 26b and 28b and 26d and 28d cooperate to provide an internal transverse bore adapted to receive the spherical valve element 23.

The valve seats 27 and 29 are mounted within the circular L-shaped ledges 26e and 28e, respectively, to mount the valve element 23 for rotational movement and to provide a sealing surface between the valve seats and the valve element.

The valve seat 27 has the configuration of a typical valve seat and is thus annular in shape and includes an internal annular concave surface portion 27a adapted to mate against the valve element 23. The valve seat 27 further includes a plurality of circumferentially spaced bores 27b which receive spring members 27c which urge the valve seat 27 into a sealed engagement against the valve element 23. Similarly, the valve seat 29 as mounted within the internal housing section 22b against internal circular ledge 28e is urged against the valve element 23. An O-ring seal 30 is positioned in the internal groove within the bore 26a of the internal housing section 22a to sealingly engage the valve seat 27. Similarly, an O-ring 31 is positioned in a groove in the longitudinal bore 28a of the internal housing section 22b to sealingly engage the valve seat 29.

The valve element 23 is a typical spherical or ball-shaped valve element. The valve element 23 has an internal cylindrical bore 23a which is adapted to align with the bore portions 26a and 28a of the internal housing sections 22a and 22b when the valve element is in the open position as illustrated in FIGS. 1 and 2. The valve element includes external spherical surface segments generally designated as 23b which are adapted to sealingly engage against the resiliently urged seats 27 and 29. The valve element 23 has a bottom circular mounting recess 23c which mounts over the trunion bearing 24d such that the valve element is mounted for rotational movement within the central bore provided by the mated internal housing section members 22a and 22b. The valve element 23 includes a valve stem 23d integrally machined with the valve element ball portion. The stem may be square to receive a handle as is well known in the art.

The top cover 25 is a circular plate and has a plurality of circumferentially spaced holes 25a machined therein to receive a plurality of mounting bolts 33 which threadedly extend into the upper annular mounting ledge 10i of the housing 10. The upper or top mounting plate 25 includes a second set of circumferentially spaced set screw openings 25b which are positioned concentrically within the bolt openings 25a to receive set screws 34 which extend into the circumferentially spaced set screw openings in the upper faces 26i and 28i of the internal housing section members 22a and 22b, respectively. The upper plate 25 includes a downwardly facing inside circular mounting rim portion 25d which is positioned against the internal cylindrical face 10h of the transverse bore 10d of the outer housing. The internal mounting rim 25d includes a groove 25e to receive an O-ring 34 to sealingly engage against the internal cylindrical transverse bore face 10h. A suitable packing assembly 36 is mounted onto the valve stem in a known manner to prevent passage of fluid between the valve stem 23d and the top mounting plate central valve stem opening 25f.

In operation and use, the modular valve V of this invention is mounted into a pipeline or flowline such as, for example, a pipeline located on the ocean floor. The outer housing is welded directly to the pipeline or flanges may be welded onto the ends such as 10b of the outer housing so that flange connections may be made between the valve V and the pipeline. Whenever it is necessary to repair the modular valve V, it is not necessary to remove the entire valve from the pipeline. Rather, it is only necessary for a diver to remove bolts 33 in order to remove the entire module of the internal housing assembly from the transverse bore 10d of the outer housing. A new or repaired modular internal housing assembly 20 can then be inserted into the transverse bore 10d and the valve V is ready to use again. It should be understood that the modular valve V of this invention may be used in many other applications other than subsea pipelines. It will be particularly useful whenever it is desirable to use a valve which can be repaired without removal of the outer housing from the flowline or pipeline.

The foregoing disclosure and description of the invention are illustrative and explanatory thereof, and various changes in the size, shape and materials, as well as in the details of the illustrated construction may be made without departing from the spirit of the invention.

We claim:

1. A modular valve comprising:
    an outer housing generally cylindrical in configuration, said outer housing having a flowline bore extending therethrough along a longitudinal axis;
    said outer housing including housing mount means for mounting said outer housing in a pipeline having a pipeline bore whereby said flowline bore of said outer housing is aligned with said bore of said pipeline;
    said outer housing having a transverse frusto-conical bore extending into said outer housing, said transverse frusto-conical bore extending across said flowline bore;
    modular valve means mounted within said transverse bore, said modular valve means including a valve assembly and valve mount means for mounting said valve assembly for movement within said modular valve means between open and closed positions to control flow through said flowline bore of said outer housing;
    modular mount means for interconnecting said modular valve means, valve assembly and valve mount means mounted means into a module for removal as a module from said outer housing transverse bore;
    said modular valve means including
        an internal housing which is generally cylindrical in a plane transverse to said longitudinal axis of said housing, said internal housing having a first bore aligned with said flowline bore of said outer housing and a second bore transverse to said first bore and extending across said first bore;
        a valve element mounted within said first and second bores of said generally cylindrical internal housing, said valve element having a valve bore therethrough;
    said valve mount means mounting said valve element for movement between open and closed positions, said valve bore being aligned with said first bore of said internal housing with said valve element in said open position, said valve mount means mounting said valve element in a sealed relationship with said first bore and second bore of said internal housing with said valve element in a closed position;
    said transverse frusto-conical bore of said outer housing further including a first bore portion having a first annular frusto-conical mounting surface and a second bore portion including a second annular frusto-conical mounting surface, said first bore portion of said transverse bore of said outer housing having a greater diameter than said second bore portion;
    said generally cylindrical internal housing being generally cylindrical in a direction parallel to said longitudinal axis of said outer housing and being generally frusto-conical in configuration along an axis transverse to said longitudinal axis of said outer housing; and
    said internal housing having first and second annular mounting rims, said first annular rim of said internal housing having a diameter greater than said second annular rim, said first annular mounting rim sealing engaging in a metal-to-metal seal said first bore portion of said transverse frusto-conical bore of said outer housing and said second annular mounting rim sealingly engaging in a metal-to-metal seal said second bore portion of said transverse bore of said outer housing.

2. The structure set forth in claim 1, including:
    said generally cylindrical internal housing including first and second internal housing sections;
    said valve element being mounted within said first and second internal housing sections; and
    said modular mount means including a first mounting plate connecting said first and second internal housing sections together.

3. The structure set forth in claim 2, including:
    said first mounting plate including a central trunion member; and
    said valve element being mounted on said trunion member for rotation.

4. The structure set forth in claim 3, including:
    said first mounting plate being positioned in said second bore portion of said transverse bore of said outer housing.

5. The structure set forth in claim 2, including:

said modular mount means including a second mounting plate mounted on the opposite side of said first and second internal housing sections from said first mounting plate for coacting with said first mounting plate to connect said first and second internal housing sections together into a unit; and said second mounting plate further mounted in removable connection to said outer housing assembly whereby, upon removal said connection said outer housing assembly, said modular valve means is removable as a unit from said outer housing.

* * * * *